United States Patent [19]
Vig et al.

[11] 4,054,965
[45] Oct. 25, 1977

[54] SELF ALIGNING MAGNETIC LOCKING DEVICE FOR MODULE SWIVEL CASTER ASSEMBLY

[75] Inventors: Satinder K. Vig, Edinboro; Harold J. Koester; William H. Berg, Jr., both of Erie, all of Pa.

[73] Assignee: American Sterilizer Company, Erie, Pa.

[21] Appl. No.: 682,985

[22] Filed: May 4, 1976

[51] Int. Cl.² .............................................. B60B 33/00
[52] U.S. Cl. ..................................... 16/35 D; 403/12; 403/111; 403/165; 403/DIG. 1
[58] Field of Search ............. 16/35 R, 35 D; 403/111, 403/DIG. 1, 12, 165; 308/10; 46/236, 237, 238, 239, 240; 211/DIG. 1; 248/206 A; 33/DIG. 1; 57/58.76

[56] References Cited
U.S. PATENT DOCUMENTS

| | | | |
|---|---|---|---|
| 2,654,112 | 10/1953 | Milhizer | 16/35 D |
| 2,687,546 | 8/1954 | Oppenheimer | 16/35 R X |
| 2,799,514 | 7/1957 | Kramcsak, Jr. | 16/35 R X |
| 3,394,494 | 7/1968 | Gardel et al. | 46/237 |
| 3,518,714 | 7/1970 | Hager | 16/35 R |

FOREIGN PATENT DOCUMENTS

| 1,048,527 | 1/1959 | Germany | 46/236 |
|---|---|---|---|

Primary Examiner—Werner H. Schroeder
Assistant Examiner—Conrad L. Berman
Attorney, Agent, or Firm—Charles L. Lovercheck

[57] ABSTRACT

A vehicle having a swivel caster wheel. The caster wheel has two spaced magnets attached to a fixed part of the caster and a third magnet attached to the caster fork so that the third magnet is influenced by the field of the first and second magnets, moving the caster to a predetermined position when the wheels are lifted from the floor. The wheels caster to proper position when they again engage the floor.

10 Claims, 6 Drawing Figures

SELF ALIGNING MAGNETIC LOCKING DEVICE FOR MODULE SWIVEL CASTER ASSEMBLY

GENERAL DESCRIPTION OF THE INVENTION

The device consists of two ceramic magnets (2 × ⅞ × ⅜ inches thick) installed on the underside of the top swivel caster bearing plates, one on each side (180° apart); and one ceramic magnet (2 × ⅞ × 3/16 inches thick) installed on the top of the caster fork bracket. The top two magnets are of one polarity and the bottom magnet is of opposite polarity. The three magnets are glued onto the base metal with contact cement adhesive. The same procedure is repeated on the second swivel caster wheel.

OPERATION

Both swivel casters are free to swivel while the module is on the floor (manual force for pushing the module is much greater than the pull of the two magnets). As soon as the module is lifted off the floor, onto a car, attracting force between the two magnets of opposite polarity pulls the swivel, floppy wheel inward, toward and inside the module base (within the overall bumper dimensions) and automatically locks the caster in line with the travel of the car.

This self-aligning feature helps prevent damage to the car's body and prevents interference with lift door openings caused by the swivel wheels flopping back and forth while riding on the car.

REFERENCE TO PRIOR ART

Patents showing mechanical wheel positioners are: U.S. Pat. Nos. 2,714,255; 2,687,546; 2,654,112; 2,799,514; 3,353,218; 3,518,714.

OBJECTS OF THE INVENTION

It is an object of the invention to provide an improved caster wheel for a vehicle.

Another object of the invention is to provide a caster wheel which is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF THE DRAWINGS

Figure 1:
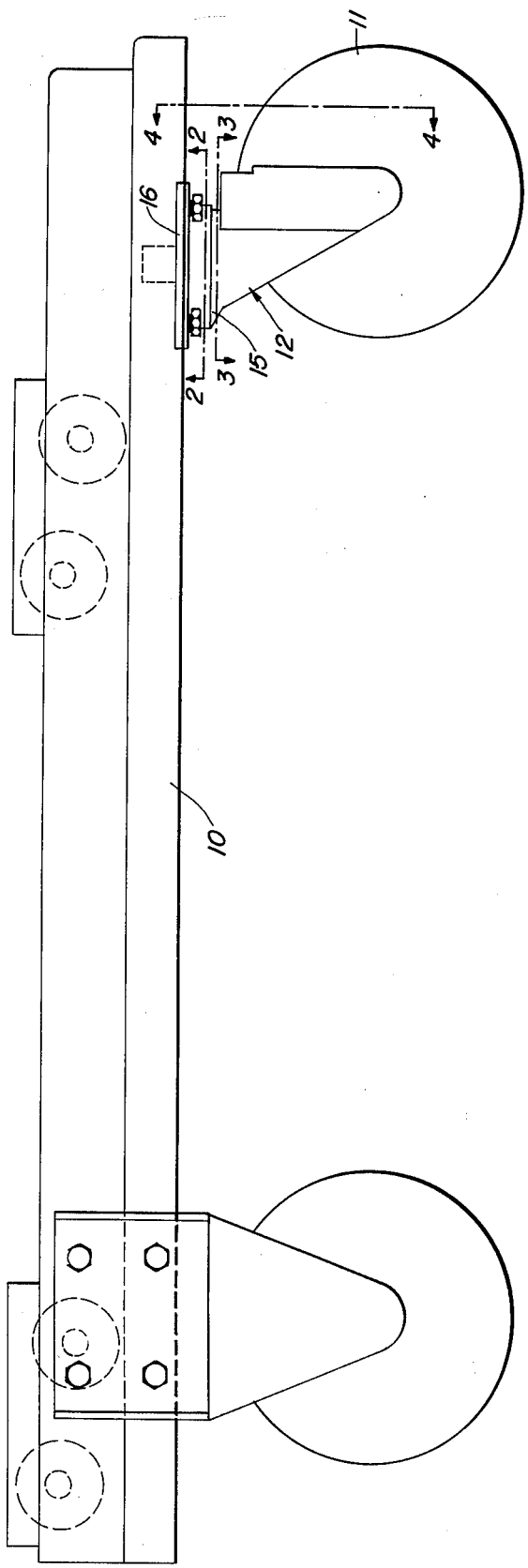
FIG. 1 is a side view of the vehicle according to the invention.
Figure 2:
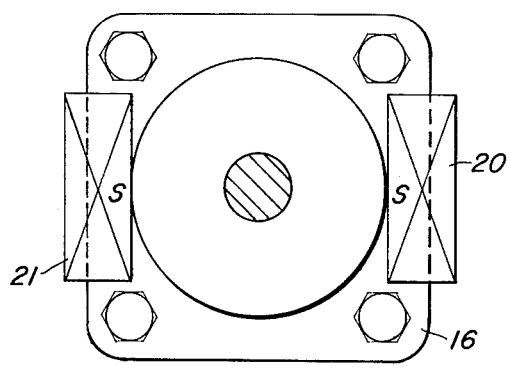
FIG. 2 is a view of the caster taken on line 2—2 of FIG. 1.
Figure 3:
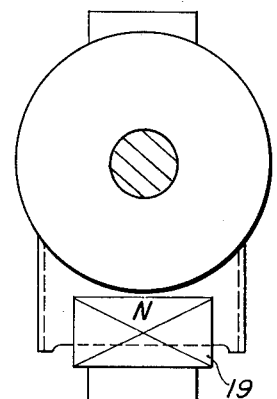
FIG. 3 is a cross-sectional view taken on line 3—3 of FIG. 1.
Figure 5:
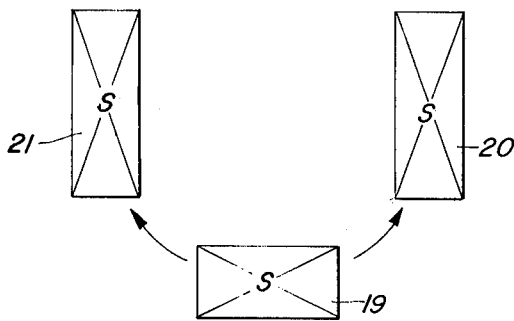
FIG. 5 is a cross-sectional schematic view showing the magnetic circuit.
Figure 6:
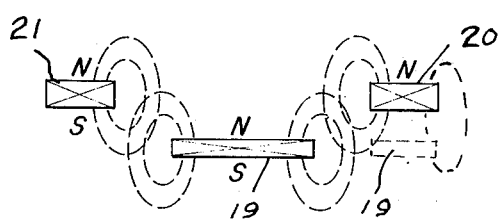
FIG. 6 is a diagramatic view of the magnetic field of the magnets.
Figure 4:
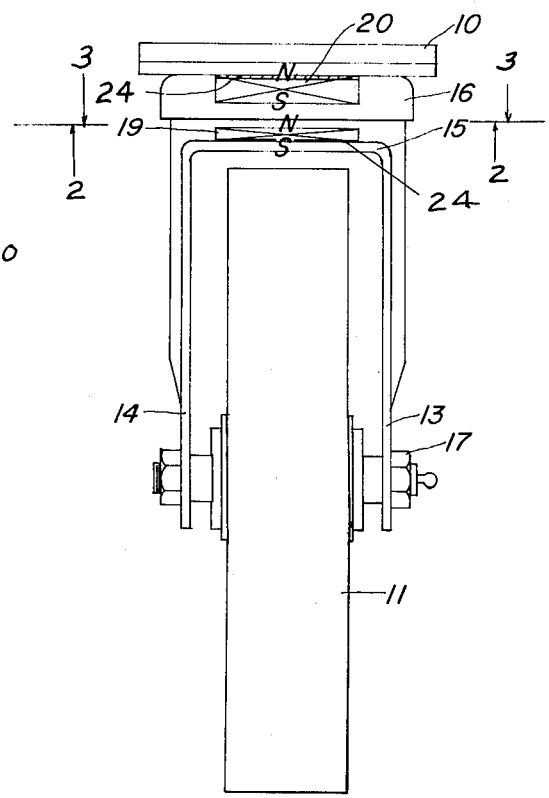
FIG. 4 is a cross-sectional view taken on line 4—4 of FIG. 1.

Now, with more particular reference to the drawing, the vehicle generally indicated at 10 has caster wheels 11 which are supported on caster forks 12. Caster forks 12 have spaced legs 13 and 14 connected together by fork bracket 15, and axle 17 extends through suitable openings in the lower end of the legs. Axle 17 is held in place by suitable nuts connecting said legs and rotatably receiving the wheels 11. The fork 12 is pivotally connected at 18 by a suitable pivotal member, familiar to those skilled in the art, connecting the fork bracket top 15 to the top bearing plate 16. A first permanent magnet 19 is fixed to the fork bracket top 15 at a position spaced from the pivot member 18, and a second permanent magnet 20 is fixed to the bearing plate 16 at positions spaced from the pivot means. A third permanent magnet 21 is fixed to the bearing plate 16 on the side of the pivot 18, opposite the magnet 20. The magnets 20 and 21 are so oriented that their fields project a field, FIGS. 1 and 2, downward, and the field (FIG. 6) of magnet 19 is disposed in the influence of this field and is urged to align itself in desired position when the vehicle is lifted from the floor, as when it is being carried by another vehicle.

The magnets are preferably of the barium ferrite type or other ceramic magnets may be used. However, metallic magnets such as Alnico mgnets could be used in this invention. The bearing plate 16, being made of iron, acts as an armature for magnets 20 and 21, since the magnet 19 is in the external field between magnet elements 20 and 21. Magnet 19 is urged toward the magnet having the opposite external polarity, in this case being magnet 20 or 21. This magnetic force on magnet 19 is sufficient to swing the caster wheel about its pivot when it is lifted off the floor. However, when the vehicle is lowered back to the floor, the caster wheel will follow the direction of driving force exerted on the vehicle. Therefore, the magnets disclosed herein do not interfere with the normal operation of the vehicle.

The magnets 19 are attached to the frame 10 and the magnets 20 and 21 are attached to the fork bracket 15 by sheets of foam plastic material 24, the foam plastic material having adhesive on each side. The sheets of foam material may be, e.g, 1/32 inches thick and may have a suitable darometer, tensile strength and sheer strength suitable to hold the magnets in position when they are adjacent each other; the sheer strength sufficient to withstand the force exerted by the magnets on each other to rotate the caster about its axis.

The foam material darometer will be such that it will compensate for any stress between the magnets and the member on which it is supported to prevent the brittle ceramic material from being broken.

When the magnets are in position, one over the other, they are spaced from each other a substantial distance, which may be e.g. approximately ⅛.

Since the magnetic force of permanent magnets increases rapidly as the magnets approach each other, by spacing the magnets from each other, a considerably better action between the caster and its frame results than if the magnets came into contact with each other when in their home position.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A swivel caster comprising,
   a caster wheel,
   a caster wheel fork having two legs connected together by a fork bracket,
   top axle means connected to said fork,
   said caster wheel being rotatably received between said legs,
   a bearing plate,
   means for attaching said bearing plate to a vehicle,
   pivot means pivotally connecting said fork top to said bearing plate,
   a first permanent magnet fixed to said fork bracket top at a position spaced from said pivot means,
   a second and third permanent magnet fixed to said bearing plate at a position spaced from said pivot means,
   said pivot means being adapted to allow said caster fork to swing about said bearing plate whereby said first magnet is attracted to said second or third magnet, urging said caster fork with said wheel to swing to a position in alignment with the magnetic field between said first magnet and said second or third magnet.

2. The caster recited in claim 1 wherein a vehicle is provided and the top of said bearing plate is fixed to said vehicle in spaced relation to said first mentioned caster wheel,
   said vehicle having side edges each comprising a bumper and said magnets arranged to swing said casters to bring them into the confines of said bumper when said vehicle is lifted from the floor.

3. A caster comprising,
   a fixed member adapted to be supported on a vehicle and
   a caster fork having a wheel therein,
   pivot means pivotally connecting said fork to said fixed member,
   said fixed member having magnetic means producing a magnetic field thereon,
   said fork having second magnetic means thereon, adapted to be attracted by said magnetic field, whereby said caster fork is urged to swing to a predetermined position.

4. A vehicle comprising a vehicle body,
   at least one caster wheel attached to said vehicle body and adapted to rest on a floor,
   said caster having a fork attached thereto and swingably attached to said body to swing about a pivot,
   first permanent magnet fixed to said body in spaced relation to said pivot,
   a second magnetic member fixed to said fork in a position spaced from said pivot and adapted to swing toward said permanent magnet whereby said caster, if swung to a predetermined position when said vehicle is lifted, moves said caster out of engagement with said floor.

5. The vehicle recited in claim 4 wherein two said first permanent magnets are provided in spaced relation to each other and attached to said caster body in spaced relation from said pivot, and
   said third magnetic member is a permanent magnet attached to said caster fork in spaced relation to said pivot.

6. The vehicle recited in claim 5 wherein said permanent magnets are made of barium ferrite material.

7. The vehicle recited in claim 6 wherein said first permanent magnets have a face disposed in a common plane and saod second permanent magnets has a face disposed in a plane spaced below said plane of said first permanent magnets and the face of said permanent magnet in said first-mentioned plane is of polarity opposite to the polarity of the face of said second-mentioned permanent magnets in said second plane.

8. The vehicle recited in claim 6 wherein said second permanent magnet is half the height of said first permanent magnet.

9. The caster recited in claim 1 wherein said magnets are fixed to said bearing plate and to said fork caster by means of a sheet of foam plastic material having adhesive coating on each side thereof,
   said adhesive coatings adhering to said bearing plate and to said caster fork with strength sufficient to withstand the force exerted between said magnets.

10. The caster recited in claim 9 wherein said first magnets are supported in spaced relation to said second magnets by a substantial distance when said magnets are in position adjacent each other.

* * * * *